US009835742B1

(12) United States Patent
Nagarkar et al.

(10) Patent No.: US 9,835,742 B1
(45) Date of Patent: Dec. 5, 2017

(54) NEUTRON IMAGING INTEGRATED CIRCUIT AND METHOD FOR DETECTING NEUTRONS

(71) Applicants: Vivek V. Nagarkar, Weston, MA (US); Mitali J. More, Bedford, MA (US)

(72) Inventors: Vivek V. Nagarkar, Weston, MA (US); Mitali J. More, Bedford, MA (US)

(73) Assignee: RADIATION MONITORING DEVICES, INC, Watertown, MA (US)

( * ) Notice: Subject to any disclaimer, the term of this patent is extended or adjusted under 35 U.S.C. 154(b) by 0 days.

(21) Appl. No.: 15/078,398

(22) Filed: Mar. 23, 2016

Related U.S. Application Data

(60) Provisional application No. 62/136,779, filed on Mar. 23, 2015.

(51) Int. Cl.
   *G01T 3/08* (2006.01)
(52) U.S. Cl.
   CPC ..................... *G01T 3/08* (2013.01)
(58) Field of Classification Search
   CPC ...... G01V 5/104; H01L 27/14609; G01T 3/08
   See application file for complete search history.

(56) References Cited

U.S. PATENT DOCUMENTS

| | | | |
|---|---|---|---|
| 8,436,289 B1* | 5/2013 | Hossain | H01L 27/14609 |
| | | | 250/214.1 |
| 2015/0378049 A1* | 12/2015 | Kramer | G01V 5/104 |
| | | | 250/269.2 |

* cited by examiner

*Primary Examiner* — Marcus Taningco
*Assistant Examiner* — Faye Boosalis
(74) *Attorney, Agent, or Firm* — Burns & Levinson LLP; Orlando Lopez

(57) ABSTRACT

The present disclosure provides a neutron imaging detector and a method for detecting neutrons. In one example, a method includes providing a neutron imaging detector including plurality of memory cells and a conversion layer on the memory cells, setting one or more of the memory cells to a first charge state, positioning the neutron imaging detector in a neutron environment for a predetermined time period, and reading a state change at one of the memory cells, and measuring a charge state change at one of the plurality of memory cells from the first charge state to a second charge state less than the first charge state, where the charge state change indicates detection of neutrons at said one of the memory cells.

19 Claims, 4 Drawing Sheets

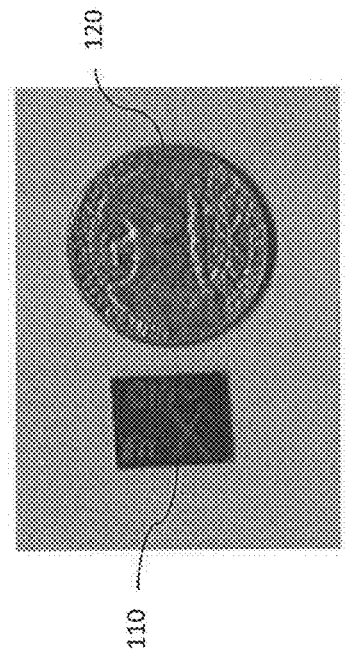
FIG. 1
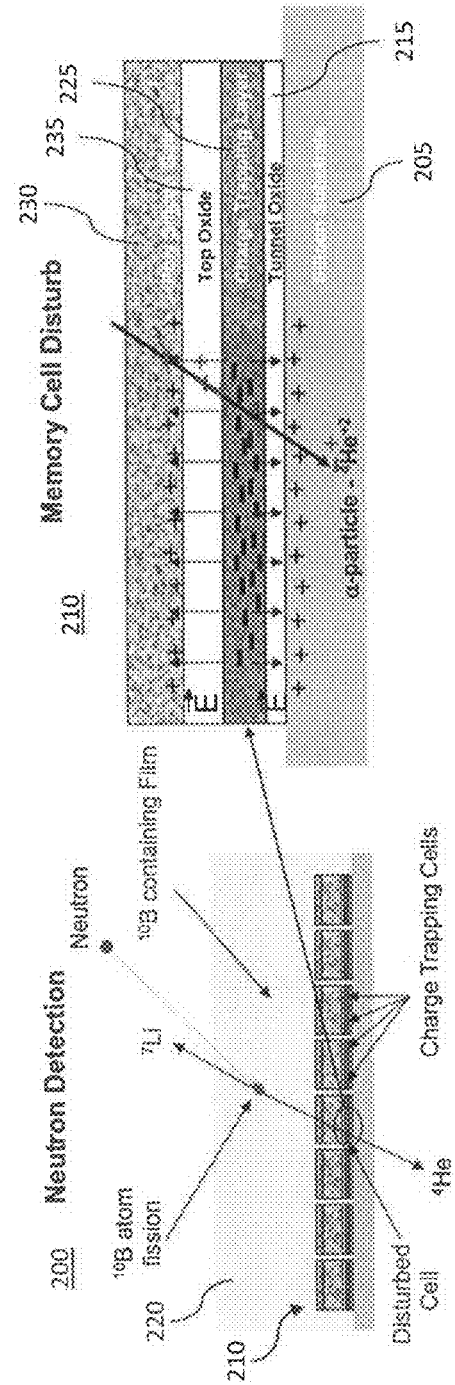
FIG. 2A
FIG. 2B

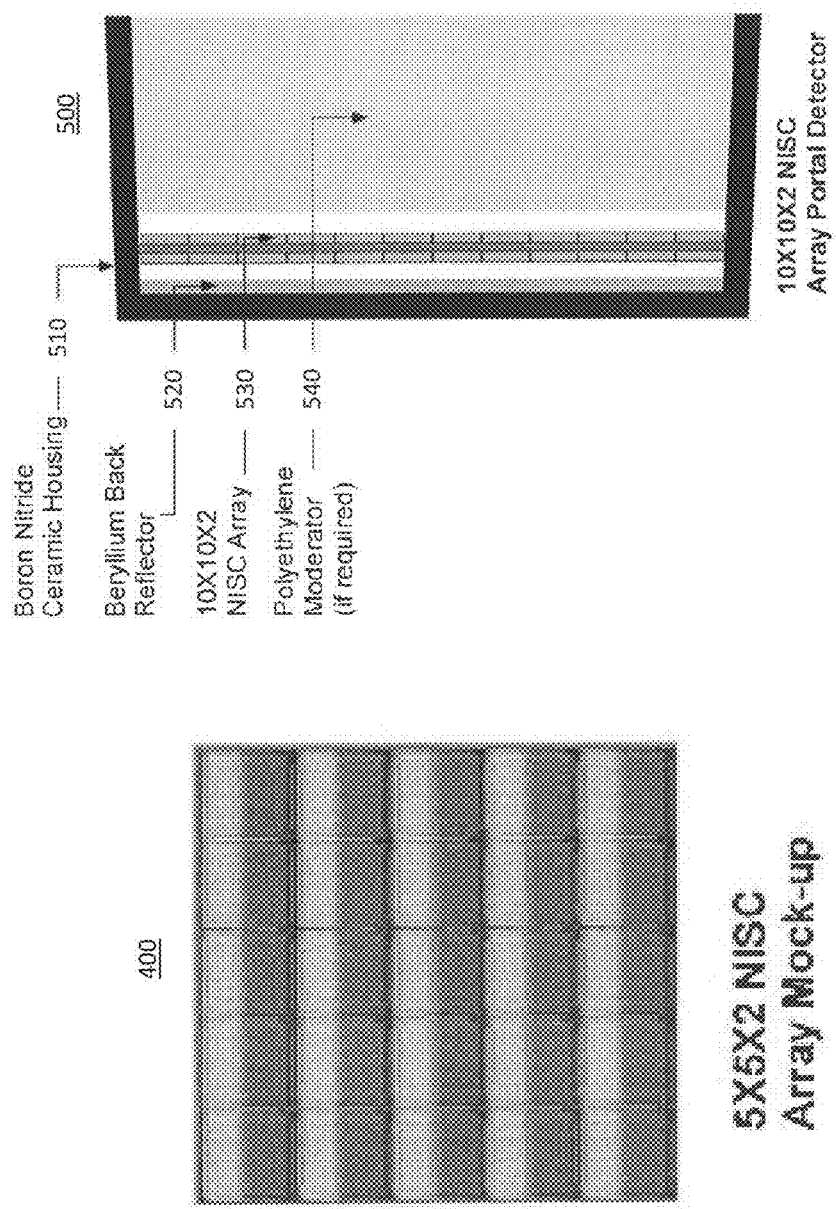

NEUTRON IMAGING INTEGRATED CIRCUIT AND METHOD FOR DETECTING NEUTRONS

CROSS REFERENCE TO RELATED APPLICATIONS

This application claims priority to and benefit of U.S. Provisional Application Ser. No. 62/136,779, filed Mar. 23, 2015, entitled NEUTRON IMAGING INTEGRATED CIRCUIT AND METHOD FOR DETECTING NEUTRONS, which is incorporated by reference herein in its entirety for all purposes.

STATEMENT OF FEDERALLY FUNDED RESEARCH OR DEVELOPMENT

The invention was supported, in whole or in part, by contract DE-SC0011880 awarded by the U.S. Department of Energy. The Government has certain rights in the invention.

BACKGROUND

The present disclosure relates to a neutron imaging detector and a method for detecting neutrons. More particularly, the present disclosure relates to a neutron imaging detector including one or more neutron imaging integrated circuit (NIICs) and a method for detecting neutrons using one or more NIICs.

To advance nuclear power as a resource capable of meeting the future energy needs through novel and safer reactor designs and fuel types, it is necessary to develop new and advanced fuels with enhanced predictability of fuel behavior under a broad range of abnormal conditions, including loss-of-coolant related accident scenarios that may cause fuel damage and melting. These novel fuels may be considerably different from existing fuels or those tested in the past, with changes including different shapes to enhance their cooling performance, different compositions to help significantly reduce the amount of waste generated during the production of nuclear energy, and different materials to improve their thermal and safety performance.

Developing and proving the basis for safe operations of advanced reactors and nuclear fuels require a thorough understanding of what could happen to nuclear fuel if it were subjected to accident conditions, such as large power increases and loss-of-cooling events. Transient tests allow such assessments and are crucial in demonstrating the safety basis of the reactor and the fuel, thus establishing what constitutes safe reactor operating levels. To meet these needs, a comprehensive transient testing program has to be established.

Transient testing involves placing fuel, either previously irradiated or un-irradiated, contained in a test assembly into the core of a nuclear test reactor and subjecting it to short bursts of intense, high-power radiation. During testing, the test assembly is monitored using specialized instruments, such as a hodoscope. Before and after the transient experiment is conducted, however, the fuel or material is nondestructively examined (NDE) to determine the effects of the radiation on the physical and chemical configuration of the nuclear fuel. Neutron radiography of the used nuclear fuel can be performed at the Hot Fuel Examination Facility (HFEF) using, for example, the Neutron Radiography Reactor (NRAD) at the Idaho National Laboratory (INL).

While current state-of-the-art X-ray radiography hardware/software packages allow NDE of various objects, X-ray techniques are of limited use in imaging the spent fuel. This is because the overwhelming gamma background from the fuel, which is as high as $10^3$-$10^6$ R/hour, obscures X-ray data. Thermal neutron radiography has proven to be the method of choice for this application.

Neutron radiography, using the foil-film transfer method, is currently employed for the quantitative evaluation of the geometric and compositional characteristics of fuel burnup distribution, visualization of cracks and void formations, fuel location determination, pellet-clad and pellet-pellet gaps identification, and to understand the state of non-fuel component geometries. Although the foil-film transfer method is gamma insensitive and provides large area high spatial resolution radiographs, this process takes approximately 24 hours to produce an image, which is impractical for neutron tomography. Tomographic reconstruction is of significant importance for the desired application as it allows real-time 3D visualization of the state of the fuel, which is important for imaging multidirectional cracks within the fuel pellets and density and/or burnup variations through the fuel rods.

Thus, there is a need for developing a high resolution digital neutron radiography detector that can simultaneously provide high spatial resolution of 10 lp/mm or better, fast data acquisition times on the order of minutes, high efficiency for thermal neutrons, minimal or no sensitivity to gamma background, that can operate in a high radiation environment and is capable of imaging highly radioactive specimens.

SUMMARY

To address the above and other drawbacks, embodiments of this disclosure provide a neutron imaging system that allows realization of an advanced nondestructively examined (NDE) system to evaluate the geometric and compositional characteristics of fuel, including disrupted fuel prior to disassembly. The disclosed system is insensitive to gamma radiation, offers high sensitivity to thermal or epi-thermal neutrons, has fast temporal response, is able to image highly-radioactive specimens with high spatial resolution, and can withstand intense mixed radiation environments. The disclosed system also features a low-cost modular design and easy scalability to realize very large active areas.

In general, the disclosure system uses one or more neutron imaging integrated circuits (NIICs). An NIIC includes a static random access or flash memory integrated circuit that is modified to include a conversion layer containing a very high concentration of an element/isotope possessing a high thermal neutron capture cross-section (e.g., Boron (B), Lithium (Li), Gadolinium (Gd)) or high epi-thermal neutron capture cross-section (e.g., Dysprosium (Dy) or Indium (In)). For example, the conversion layer may include $^{10}B$ incorporated into borophosphosilicate glass (BPSG), $B_2O_3$, $B_4C$. In further embodiments, other neutron sensitive materials may be employed without limit.

In one aspect, the present disclosure provides a neutron imaging system, including an array of neutron imaging integrated circuit (NIIC) stacks with neighboring NIIC stacks abutting each other, each of the NIIC stacks including one or more memory chips. Each of the memory chips includes a silicon substrate, a plurality of memory cells formed on the silicon substrate, and a conversion layer formed on the memory cells, the conversion layer including a predetermined concentration of $^{10}B$. In certain embodiments, the detector array may be a linear array for scanning or a 2D array for scanning and/or direct radiography. Embodiments of the detector may be employed for use in tomography, tomosynthesis, and/or phase-contrast imaging.

Embodiments of the system may be configured to minimize inter-chip "dead space," regions of the NIIC array which do not participate in neutron detection. For example, in one embodiment, the in-plane arrangement of the memory chips within the array may be selected so as to minimize inter-chip dead space. In other embodiments, adjacent planes of the array may be offset with respect to one another in order to fill inter-chip gaps. In further embodiments, the detector is mechanically translatable within a selected plane to address the inter-chip gap.

As discussed in greater detail below, each memory cell is addressable to determine whether the charge state of the cell has been changed due to neutron interaction. Accordingly, software binning may be employed to identify the location within the detector to enhance the dynamic range of the detector.

In one embodiment, the conversion layer includes one of borophosphosilicate glass (BPSG), $B_2O_3$, $B_4C$, and a combination thereof.

In one embodiment, the predetermined concentration is greater than or equal to 9.15E+21 atoms/cm$^3$.

In one embodiment, the memory cell includes a charge trapping layer and a polysilicon gate on the charge trapping layer.

In one embodiment, each of the NIIC stacks includes two vertically piled memory chips.

In one embodiment, each of the NIIC stacks includes twelve vertically piled memory chips.

In further embodiments, two or more systems may be employed together for simultaneous imaging of thermal and epi-thermal neutrons. For example, a system including a conversion layer suitable for detection of thermal neutrons (e.g., a conversion layer including $^{10}B$) may be used in conjunction with another system including a conversion layer suitable for detection of epi-thermal neutrons (e.g., a conversion layer including Dy or In).

In an embodiment of the disclosure, a method for detecting neutrons is provided. The method includes setting one or more of memory cells to a first charge state in a neutron imaging system. The neutron imaging system includes a plurality of neutron detecting devices positioned in a selected array configuration. Each neutron detecting device includes one or more memory cells, the memory cell storing charge, and a conversion layer positioned on the memory cells. The conversion layer includes a predetermined concentration of an element possessing a high capture cross-section to at least one of thermal neutrons, epi-thermal neutrons, and fast neutrons. The method further includes setting one or more of the memory cells to a first charge state, positioning the neutron imaging system in a neutron environment for a predetermined time period, and measuring a charge state change at one of the plurality of memory cells from the first charge state to a second charge state, where the second charge state is lower than the first charge state, the charge state change indicating detection of neutrons at the measured memory cell.

In further embodiments, the method includes one or more of the following, in any combination.

In an embodiment, the method further includes determining the array location of the memory cell at which the charge state change is measured.

In an embodiment of the method, the conversion layer possesses a high thermal neutron capture cross-section and includes $^{10}B$.

In an embodiment of the method, the conversion layer includes at least one of borophosphosilicate glass (BPSG), $B_2O_3$, and $B_4C$.

In an embodiment of the method, the predetermined concentration is greater than about 9.15E+21 $^{10}B$ atoms/cm$^3$.

In an embodiment of the method, the conversion layer possesses a high thermal neutron cross-section and includes Gd or Li.

In an embodiment of the method, the conversion layer possesses a high epi-thermal neutron capture cross-section and includes Dy or In.

In an embodiment of the method, the selected array configuration is 10×10×2.

In an embodiment of the method, the selected array configuration is 5×5×2.

BRIEF DESCRIPTION OF THE DRAWINGS

For a better understanding of the present disclosure, together with other and further needs thereof, reference is made to the accompanying drawings and detailed description.

FIG. 1 illustrates a 1×1 cm$^2$ NIIC detector in comparison with a U.S. quarter dollar coin.

FIG. 2A illustrates memory cells of a NIIC including a conversion layer that contains $^{10}B$, in accordance with an embodiment of the present disclosure.

FIG. 2B illustrates an enlarged view of a memory cell shown in FIG. 2A.

FIG. 4 illustrates a plane view of an array of NIIC stacks, each stack including two vertically piled NIICs (i.e., 5×5×2), in accordance with an embodiment of the present disclosure.

FIG. 5 illustrates a sectional view of a 10×10×2 array of NIIC stacks, in accordance with an embodiment of the present disclosure.

DETAILED DESCRIPTION

Figure 3A:
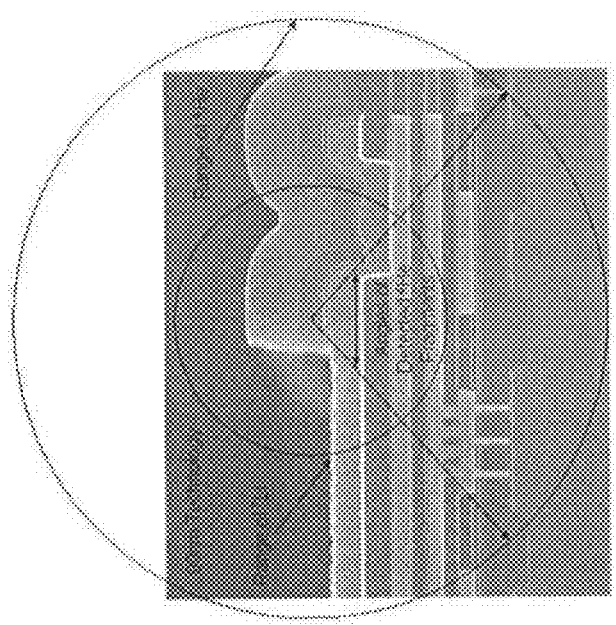
FIG. 3A illustrates a finite range effect of different particles.

Hereafter, embodiments of the present disclosure are described in further detail with reference to the accompanying drawings.

The following detailed description presents the currently contemplated modes of carrying out the invention. The description is not to be taken in a limiting sense, but is made merely for the purpose of illustrating the general principles of the invention.

As used herein, the singular forms "a," "an," and "the" include the plural reference unless the context clearly dictates otherwise.

Except where otherwise indicated, all numbers expressing quantities of ingredients, reaction conditions, and so forth used in the specification and claims are to be understood as being modified in all instances by the term "about."

Static random access memories (SRAMs) are sensitive to alpha particles. As such, SRAMs may be used to intentionally detect alpha particles. In operation, for example, all bits of a SRAM can be initialized to a first charge state (e.g., a ONE state). The electronic charge generated by the interaction of alpha particles with silicon of memory cells may change the contents from a ONE state to a second charge state less than the first charge state (e.g., a ZERO state). The detection is then completed by periodic monitoring the SRAM using a simple microprocessor circuit and counting the number of ZERO states in the SRAM.

In order to use memory chips to additionally or alternatively detect neutrons, a $^{10}$B rich BPSG converter layer can be introduced in a memory chip (e.g., having a 1×1 cm$^2$ large area die with 2 GB of memory capacity). FIG. 1 illustrates a 1×1 cm$^2$ NIIC detector 110 in comparison with a U.S. quarter dollar coin 120.

FIG. 2A illustrates memory cells 210 of a NIIC 200 including a conversion layer 220 that contains $^{10}$B, in accordance with an embodiment of the present disclosure. FIG. 2B illustrates an enlarged view of a memory cell 210 shown in FIG. 2A. As shown in FIGS. 2A and 2B, neutron fission with $^{10}$B produces $^7$Li and $^4$He particles that cause local ionization and disrupts the state of the bit. In certain embodiments, conversion layer 220 includes a material having a very high concentration (e.g., greater than or equal to 9.15E+21 boron atoms/cm$^3$) of $^{10}$B. For example, conversion layer 220 may include at least one of borophosphosilicate glass (BPSG), $B_2O_3$, $B_4C$, and/or other neutron sensitive materials such as Li, Gd, Dy, and In. Embodiments below are discussed in the context of a $^{10}$B BPSG conversion layer. However, in alternative embodiments, conversion layers including different neutron sensitive materials may be employed without limit.

Referring to FIGS. 2A and 2B, the memory cell 210 includes a tunnel oxide layer 215 formed on a silicon substrate 205, a charge trapping layer 225 formed on tunnel oxide layer 215, a top oxide layer 235 formed on charge trapping layer 225, and a polysilicon gate 230 formed on top oxide 235. The operation mode of the NIIC is based on disrupting the status of transistor "gate" 230 in memory cell 210 when a neutron interacts with $^{10}$B in a conversion layer 220 formed over all memory cells 210. (For further elucidation see U.S. Pat. No. 8,436,289, which is incorporated by reference herein in its entirety for all purposes.)

Figure 3B:
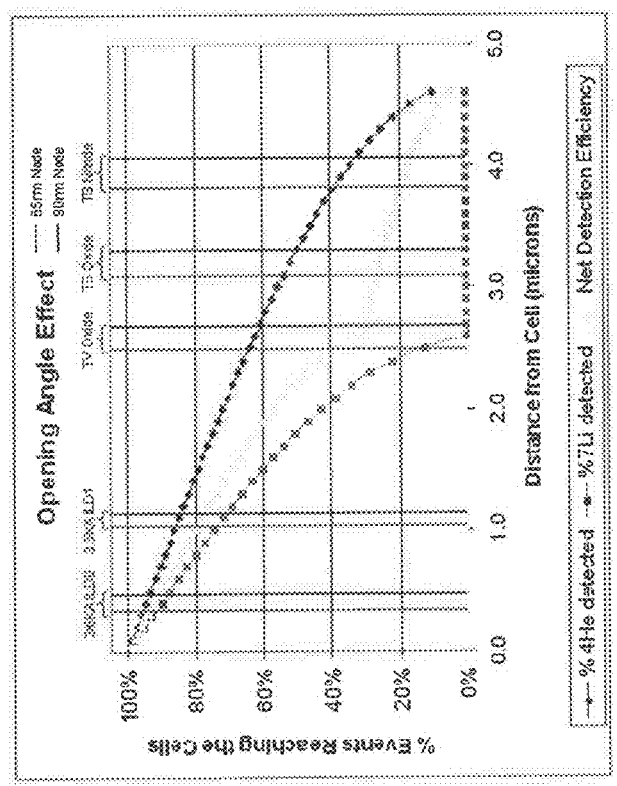
FIG. 3B illustrates the effect of finite fission fragment range on memory cell detection probability, with various layers considered for $^{10}B$ loading being shown by vertical lines for both 90 nm and 65 nm technology.

To enhance the interaction probability, a dielectric layer containing a high neutron capture cross-section material, such as $^{10}$B (BPSG in this case), is deposited on each memory cell 210. When a neutron penetrates into this neutron sensitive material, it reacts with the $^{10}$B nucleus. The ranges of the resultant charged particles in the memory cell are small, typically on the order of several microns, and they produce a large number of electron-hole pairs along their path. For instance, the range of α particles in SiO$_2$ and Cu layers of a typical memory chip is 5.66 μm and 2.55 μm respectively, whereas the same for a $^7$Li ion is 2.7 μm and 1.35 μm. The range of these particles in a typical NIIC device 200 and their ability to reach the gate structure 230 is shown in FIGS. 3A and 3B.

The induced electron-hole pairs produce an internal electric field which disrupts the state of the memory cell by turning its transistor off. This scenario is depicted in FIGS. 2A and 2B, where a neutron capture induced a particle passes through the gate structure 230 of a single memory cell 210. The transistor is in its "on" state prior to interaction with the charge particle (or, "one" state of the memory bit) and is switched to its "off" state due to fading of the electron/hole current of the transistor. This change compels the memory cell's capacitor to discharge, resulting in a "zero" state of the memory bit, which can be read by an external controlling circuit that constantly reads the state of the memory cells 210 in a manner similar to what is done in memories inside personal computers. Thus, in the beginning, one or more of the memory cells is initialized to "ones," and the detection is completed by periodic monitoring using a simple microprocessor circuit and counting the number of zeroes in memory chip 200.

In addition to basic neutron detection and counting, the NIIC detector 200 also provides precise information on the location (bit address) of the neutron interaction within the converter layer 220. For example, software binning of the memory cells may be employed for enhanced dynamic range, as dynamic range is inversely related to achievable spatial resolution. Thus, the same chip can also be used for high resolution thermal neutron imaging. To realize a large area imaging detector, multiple chips may be arranged in an array to form a neutron detector module. Multiple such neutron detector modules can be employed to achieve the desired active imaging area. Features of the NIIC detector include, for example:

High efficiency thermal neutron detection (up to 40% per chip);
Immune to gamma rays (n-γ discrimination exceeding $10^{-7}$);
Exceptional spatial resolution (intrinsic resolution of 0.3 μm, the single bit dimension);
Fast temporal resolution (2 second readout time);
Non-volatile recyclable device (passive detection capable);
Ability to image radioactive specimens;
Operation in intense radiation fields;
Industry standard packaging and interface;
Ultra-low-power, IC-based solid state detector;
−25° C. to 90° C. temperature range; and
10 year/100K cycling data retention/endurance.

FIG. 4 illustrates a plane view of an array 400 of NIIC stacks (5×5×2), each stack including two vertically piled NIICs, in accordance with an embodiment of the present disclosure. FIG. 5 illustrates a sectional view of an array of NIIC stacks (10×10×2), in accordance with an embodiment of the present disclosure. Referring to both FIGS. 4 and 5, a neutron detector module 500 includes a ceramic housing 510, a reflector layer 520 formed at a bottom surface of housing 510, a NIIC array 530 disposed on reflector 520, and an optional moderator layer 540 on the NIIC array 530 and filling housing 510.

In one embodiment, as shown in FIG. 4, the NIIC array 400 includes 5×5 NIIC stacks, each stack including two vertically piled NIICs. The NIIC stacks are disposed such that sides of two neighboring NIIC nearing or abutting each other. In another embodiment, as shown in FIG. 5, NIIC array 530 includes 10×10 NIIC stacks, each stack including two vertically piled NIICs. In certain embodiments, the two vertically piled NIICs can be vertically separated by a distance of about 10-20 μm.

Figure 6:
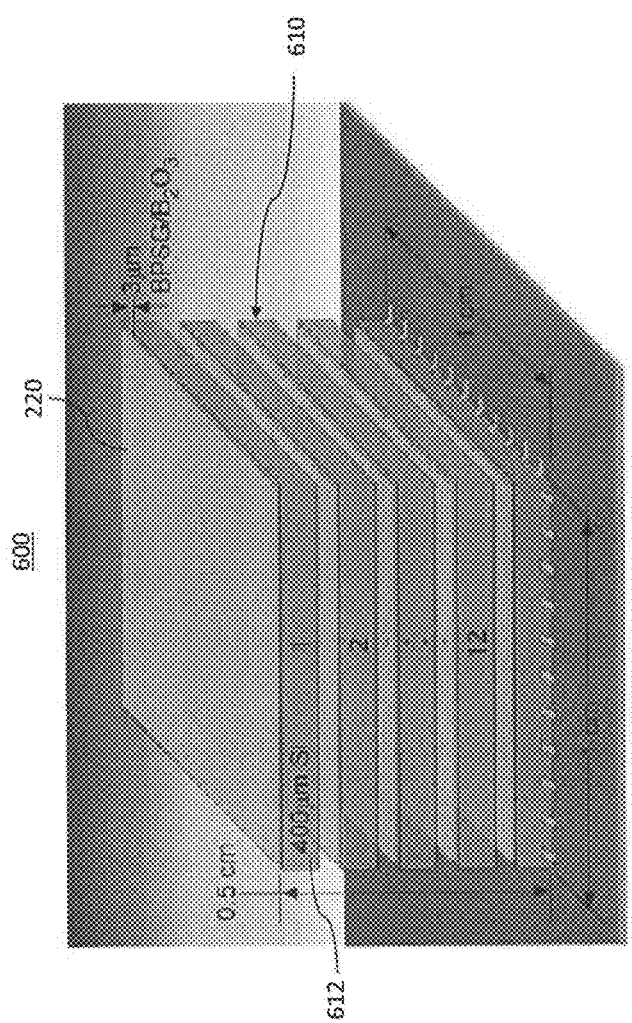
FIG. 6 illustrates a perspective view of a NIIC stack, including twelve vertically piled NIICs, in accordance with an embodiment of the present disclosure.

FIG. 6 illustrates a perspective view of a NIIC stack 600, including twelve vertically piled NIICs 610, in accordance with an embodiment of the present disclosure. As shown in FIG. 6, NIIC stack 600 has a length of 1 cm and a width of 1 cm. Each of the vertically piled NIICs 610 has a silicon layer 612 of about 400 m thick and a conversion layer (BPSG/$B_2O_3$) 614 of about 3 μm thick. The NIIC stack 600, when piled up, has a total thickness of about 0.5 cm. As such, in this particular embodiment, the NIICs 610 are vertically separated with each other by a distance of about 15 μm.

Embodiments of the system may be configured to minimize inter-chip "dead space," regions of the NIIC array which do not participate in neutron detection. For example, in one embodiment, the in-plane arrangement of the memory chips within the array may be selected so as to minimize inter-chip dead space. In other embodiments, adjacent planes of the array may be offset with respect to one another in order to fill inter-chip gaps. In further embodiments, the detector is mechanically translatable within a selected plane to address the inter-chip gap.

Practical Aspects of NIIC

1. Scale-Up Production

One of the strongest attributes of the disclosed NIIC detector is its suitability for scale up production. Being a semiconductor IC, millions of chips can be fabricated in a short period of time. For example, a 300 mm wafer can be used to produce NIICs. With 1 cm×1 cm die, approximately 650 devices can be implemented on a single wafer. A single production lot processes 25 such wafers, thus the total number of devices that may be manufactured is 650×25 or 16,250 in a given lot. Large numbers of lots can be processed in this manner, depending on the application needs.

2. Device Cost

The cost per device is consistent with the semiconductor chip manufacturing costs. With a production run of $10^6$ devices, the cost can be expected to be in the $0.50 to $1.00 per NIIC chip range. Production of a single lot containing about 16,000 devices would run the chip cost at $10/chip, and production of just a few wafers would result in a higher cost of about $100/chip.

3. Active Area

The active area of each of the dies in the NIIC chip can be approximately 1×1 $cm^2$. To realize a large active area detector, the chips can be abutted as shown in FIG. 4. Since each of the NIIC devices contains a large number of memory elements (which can be viewed as pixels in an imaging sensor) an array of chips formed in this fashion can be used as a thermal neutron imaging device. The number of dies and geometry of a NIIC stack can be customized to meet the efficiency and spatial resolution requirements of a given application. Given the low cost and ultra-low power consumption per chip, very large active areas can be realized with the NIIC chip.

4. Operation Modes and On-Chip Processing

The NIIC devices can be operated in both active and passive modes, because the chip architecture is such that it does not need any power for operation. Although the readout process needs power, the power requirement is extremely low (e.g., 1.8 Vcc, Icc standby 2 μA, 3 μA max). Because the NIIC device is a semiconductor device, an on board microcontroller, such as the 8λ51 family, may be integrated on the chip for data processing. Thus, depending on the application needs, functionality can be flexibly incorporated into the device for stand-alone or integrated use.

5. Data Readout

The readout rate of the device is about 1 ns/bit. Given that each die contains, for example, 2 GB, each device can be fully read in approximately 2 sec. Since each die is read separately with its own onboard circuitry, the NIIC readout rate remains at about 2 sec/readout, even though the number of dies in a given chip stack could be as high as 12. Note that since each neutron causes upset of at most 2 bits, a very large number of neutron captures per die/per readout cycle can be achieved and the device is not limiting counting in practical special nuclear material (SNM) detection or radiographic imaging scenarios.

6. Detector Form Factor

The circuitry to read SRAMs is well established and easily available. It can be implemented on the chip itself or on a very small printed circuit board (PCB). The data may be communicated to a PC using ultrathin, flexible, ribbon cables. The form factor of the detector, including its readout can therefore be less than 1 $cm^3$. This renders the detector to be an ideal device for incorporating in an array to form an area detector, as is desired in the present radiographic configuration.

For the purposes of describing and defining the present teachings, it is noted that terms of degree (e.g., "substantially," "slightly," "about," "comparable," etc.) may be utilized herein to represent the inherent degree of uncertainty that may be attributed to any quantitative comparison, value, measurement, or other representation. Such terms of degree may also be utilized herein to represent the degree by which a quantitative representation may vary from a stated reference (e.g., about 10% or less) without resulting in a change in the basic function of the subject matter at issue.

Although the present disclosure has been described with respect to various embodiments, it would be apparent to one of ordinary skill in the art that various other embodiments are possible, without departing from the spirit and scope as defined in the appended claims.

The invention claimed is:

1. A method for imaging a specimen, where the specimen produces neutrons, the method comprising:
   setting one or more of memory cells to a first charge state in a neutron imaging system; the neutron imaging system comprising:
   a plurality of neutron detecting devices positioned in a selected array configuration; each neutron detecting device comprising:
   at least one memory cell, the at least one memory cell storing charge, and
   a conversion layer positioned on the at least one memory cell, the conversion layer comprising a predetermined concentration of an element possessing a high capture cross-section to at least one of thermal neutrons, epi-thermal neutrons, and fast neutrons;
   positioning the neutron imaging system in a neutron environment for a predetermined time period; and
   measuring a charge state change at the at least one memory cell from the first charge state to a second charge state, where the second charge state is lower than the first charge state, the charge state change indicating detection of neutrons at the at least one memory cell;
   wherein the selected array configuration includes at least two layers of neutron detecting devices, one layer being stacked over another layer; and wherein the selected array configuration is configured to minimize dead-space between neutron detecting devices.

2. The method of claim 1, further comprising determining an array location of the at least one memory cell at which the charge state change is measured.

3. The method of claim 1, wherein the conversion layer possesses a high thermal neutron capture cross-section and comprises $^{10}B$.

4. The method of claim 3, wherein the conversion layer comprises at least one of borophosphosilicate glass (BPSG), $B_2O_3$, and $B_4C$.

5. The method of claim 3, wherein the predetermined concentration is greater than 9.15E+21 boron atoms/cm3.

6. The method of claim 1, wherein the conversion layer possesses a high thermal neutron cross-section and comprises Gd or Li.

7. The method of claim 1, wherein the conversion layer possesses a high epi-thermal neutron capture cross-section and comprises Dy or In.

8. The method of claim 1, wherein the selected array configuration is 10×10×2.

9. The method of claim 1, wherein the selected array configuration is 5×5×2.

10. The method of claim 1, wherein an in-plane arrangement of the selected array configuration is configured to minimize dead-space between neutron detecting devices.

11. The method of claim 1 further comprising mechanically translating one of said one layer and said another layer with respect to another one of said another layer and said one layer with respect to each other in order to minimize dead-space between the neutron detecting devices.

12. The method of claim 1, wherein the neutron imaging system comprises:
   a first plurality of neutron detecting devices positioned in a selected array configuration; each neutron detecting device comprising:
   at least one memory cell, the at least one memory cell storing charge, and
   a first conversion layer positioned on the at least one memory cell, the conversion layer comprising a predetermined concentration of a first element possessing a high capture cross-section to at least one of thermal neutrons, epi-thermal neutrons, and fast neutrons; and
   a second plurality of neutron detecting devices positioned in a selected array configuration; each neutron detecting device comprising:
   at least one memory cell, the at least one memory cell storing charge, and
   a second conversion layer positioned on the at least one memory cell, the conversion layer comprising a predetermined concentration of a second element possessing a high capture cross-section to at least one of thermal neutrons, epi-thermal neutrons, and fast neutrons; the second element being different from the first element.

13. The method of claim 12, wherein the first element is $^{10}$B and wherein the second element is selected from Gd, Li, Dy and In.

14. A method for imaging a specimen, where the specimen produces neutrons, the method comprising:
   setting one or more of memory cells to a first charge state in a neutron imaging system; the neutron imaging system comprising:
   a plurality of neutron detecting devices positioned in a selected array configuration; each neutron detecting device comprising:
   at least one memory cell, the at least one memory cell storing charge, and
   a conversion layer positioned on the at least one memory cell, the conversion layer comprising a predetermined concentration of an element possessing a high capture cross-section to at least one of thermal neutrons, epi-thermal neutrons, and fast neutrons;
   positioning the neutron imaging system in a neutron environment for a predetermined time period; and
   measuring a charge state change at the at least one memory cell from the first charge state to a second charge state, where the second charge state is lower than the first charge state, the charge state change indicating detection of neutrons at the at least one memory cell;
   wherein the selected array configuration includes at least two layers of neutron detecting devices, one layer being stacked over another layer; and wherein neutron detecting devices in said one layer are offset with respect to neutron detecting devices in said another layer in order to minimize dead-space between the neutron detecting devices.

15. The method of claim 14, wherein the conversion layer possesses a high thermal neutron capture cross-section and comprises $^{10}$B.

16. The method of claim 15, wherein the conversion layer comprises at least one of borophosphosilicate glass (BPSG), $B_2O_3$, and $B_4C$.

17. The method of claim 15, wherein the predetermined concentration is greater than 9.15E+21 boron atoms/cm$^3$.

18. The method of claim 14, wherein the conversion layer possesses a high thermal neutron cross-section and comprises Gd or Li.

19. The method of claim 14, wherein the conversion layer possesses a high epi-thermal neutron capture cross-section and comprises Dy or In.

* * * * *